United States Patent
Horan et al.

(10) Patent No.: US 6,383,589 B1
(45) Date of Patent: May 7, 2002

(54) MULTILAYER PLASTIC STRUCTURES, CONTAINERS MADE THEREFROM, AND METHODS OF MAKING THE STRUCTURES

(75) Inventors: David C. Horan; Thomas R. Lee, both of Appleton, WI (US)

(73) Assignee: Pechiney Plastic Packaging, Inc., Chicago, IL (US)

( * ) Notice: Subject to any disclaimer, the term of this patent is extended or adjusted under 35 U.S.C. 154(b) by 0 days.

(21) Appl. No.: 09/280,623

(22) Filed: Mar. 29, 1999

(51) Int. Cl.$^7$ .................................................. B32B 1/08
(52) U.S. Cl. ................... 428/36.91; 428/35.7; 428/168; 220/92; 220/107
(58) Field of Search ............................ 428/36.91, 35.7, 428/168; 222/107, 92

(56) References Cited

U.S. PATENT DOCUMENTS

| | | | |
|---|---|---|---|
| 3,154,461 A | 10/1964 | Johnson | 161/116 |
| 3,234,034 A | 2/1966 | Jasinski et al. | 106/54 |
| 3,347,419 A | * 10/1967 | Brandt et al. | 222/107 |
| 3,946,905 A | 3/1976 | Cogliano | 222/107 |
| 4,139,665 A | 2/1979 | Herrero | 428/35 |
| 4,217,161 A | 8/1980 | Yamada et al. | 156/242 |
| 4,261,482 A | 4/1981 | Yamada et al. | 222/215 |
| 4,390,573 A | * 6/1983 | Bullard et al. | 428/35 |
| 4,418,112 A | 11/1983 | Toyoda et al. | 428/212 |
| 4,440,824 A | 4/1984 | Bonis | 428/216 |
| 4,526,823 A | 7/1985 | Farrell et al. | 428/35 |
| 4,551,365 A | 11/1985 | Bonis | 428/35 |
| 4,561,692 A | 12/1985 | Yestadt et al. | 297/93 |
| 4,572,854 A | 2/1986 | Dallmann et al. | 428/35 |
| 4,574,104 A | 3/1986 | Aishima et al. | 428/220 |
| 4,647,509 A | 3/1987 | Wallace et al. | 428/474.9 |
| 4,659,408 A | 4/1987 | Redding | 156/244.17 |
| 4,681,797 A | 7/1987 | Van Iseghem | 428/212 |
| 4,705,708 A | 11/1987 | Briggs et al. | 428/35 |
| 4,724,185 A | 2/1988 | Shah | 428/339 |
| 4,871,613 A | 10/1989 | Akao | 428/328 |
| 4,882,310 A | 11/1989 | Arai et al. | 503/207 |
| 4,894,291 A | 1/1990 | Ofstein | 428/518 |
| 4,960,648 A | 10/1990 | Yamada | 428/476.3 |
| 4,977,033 A | 12/1990 | Akao | 428/516 |
| 5,041,316 A | 8/1991 | Parnell et al. | 428/35.4 |
| 5,100,721 A | 3/1992 | Akao | 428/218 |
| 5,110,855 A | 5/1992 | Blatz | 524/441 |
| 5,252,384 A | 10/1993 | Bothe et al. | 428/212 |
| 5,301,840 A | 4/1994 | Sun | 228/109 |
| 5,326,625 A | 7/1994 | Schuhmann et al. | 428/215 |
| 5,382,470 A | 1/1995 | Vicik | 428/334 |
| 5,427,730 A | 6/1995 | Son et al. | 264/235.8 |
| 5,489,471 A | 2/1996 | Inoue et al. | 428/304.4 |

(List continued on next page.)

OTHER PUBLICATIONS

"Paper–Like Filled Polyethylene Films", V. G. Zboril and D. A. Harbourne, Polymer Composites, Jan., 1984, pp. 81–87, vol. 5, No. 1.

Primary Examiner—Harold Pyon
Assistant Examiner—Sow-Fun Hon
(74) Attorney, Agent, or Firm—Ohlandt, Greeley, Ruggiero & Perle, LLP

(57) ABSTRACT

An improved coextruded asymmetric multilayer plastic structure and method of forming the same are provided. The layers of the structure consist of a barrier layer comprised of an ethylene vinyl alcohol copolymer, an adhesive layer on each surface of the barrier layer, inner and outer surface layers, and a bulk layer positioned between the outer surface layer and its adjacent adhesive layers. The bulk layer is comprised of a thermoplastic polymer and calcium carbonate in an amount sufficient that the multilayer structure has an acceptable level of curling. The structure can be used to form a tubular body that has a cylindrical shape.

A collapsible dispensing container having a body wall formed of the aforementioned structure and having improved product dispense properties is also provided.

2 Claims, 2 Drawing Sheets

U.S. PATENT DOCUMENTS

| | | | |
|---|---|---|---|
| 5,506,011 A | 4/1996 | Farrell et al. | 428/34.2 |
| 5,534,582 A | 7/1996 | Krause et al. | 524/441 |
| 5,558,930 A | 9/1996 | DiPoto | 428/216 |
| 5,609,930 A | 3/1997 | Matsunaga et al. | 428/35.2 |
| 5,656,346 A | 8/1997 | Hirt | 428/36.91 |
| 5,679,422 A | 10/1997 | Lind et al. | 428/34.8 |
| 5,683,802 A | 11/1997 | Murschall et al. | 428/325 |
| 5,695,840 A | 12/1997 | Mueller | 428/357 |
| 5,698,333 A | 12/1997 | Benoit et al. | 428/516 |
| 5,712,023 A | 1/1998 | Nakajima et al. | 428/195 |
| 5,759,648 A | 6/1998 | Idlas | 428/349 |
| 5,800,913 A | 9/1998 | Mauer et al. | 428/323 |
| 5,851,640 A | 12/1998 | Schuhmann et al. | 428/200 |
| 5,900,294 A | 5/1999 | Murschall et al. | 428/34.8 |
| 5,913,449 A * | 6/1999 | Branch et al. | 220/677 |
| 5,948,513 A | 9/1999 | Turnbull et al. | 428/201 |
| 5,972,443 A * | 10/1999 | Breck et al. | 428/35.2 |
| 6,042,906 A | 3/2000 | Itoh et al. | 428/35.2 |
| 6,071,626 A | 6/2000 | Frisk | 428/518 |
| 6,093,462 A | 7/2000 | O'Herron et al. | 428/35.2 |
| 6,110,600 A | 8/2000 | Ramesh | 428/476.9 |

* cited by examiner

MULTILAYER PLASTIC STRUCTURES, CONTAINERS MADE THEREFROM, AND METHODS OF MAKING THE STRUCTURES

BACKGROUND OF THE INVENTION

1. Field of the Invention

This invention relates to multilayer plastic structures, for example, film and sheet structures suitable for forming articles, for example, containers. More particularly, this invention is directed to multilayer asymmetric foilless plastic film and sheet structures suitable for forming containers, for example, collapsible dispensing containers, e.g., tubes, for packaging food, dentifrice, cosmetic, industrial, home-use and other products. The invention is also directed to such containers and methods of making the structures.

2. Description of Related Art

Collapsible dispensing containers, such as tubes for packaging food products, dentifrices and cosmetics have been in use for many years. Historically, the tubular bodies of such tubes have been made of a single layer of metal or plastic, multiple layers comprised of plastic, metal foil and/or paper, and, more recently, multiple layers of only plastics. The all-metal tube bodies are excellent barriers to oxygen, and they deform readily and have excellent product dispense properties, including excellent deadfold properties. That is, they deform, crease or fold easily and retain their deformed, creased or folded shape. However, they dent easily and they tend to crack with a moderate number of repeated flexures. Multilayer tubular bodies which include plastic layers and a layer of foil are advantageous in that the plastic layers are aesthetically pleasant, dent less and provide a smooth feel and a better print surface. The plastic layers protect the foil layer, reduce its tendency to crack on flexing, and isolate it from the packaged product. The metal foil layer is an excellent barrier to oxygen and it can provide good deadfold properties when employed in certain thicknesses and plastic layer configurations. The plastic layers generally have memory such that when they are deformed to dispense product, they tend to return to their original undeformed shape.

Commercial multilayer foil-containing film or sheet structures and collapsible dispensing tubes made therefrom for packaging dentifrice generally have had seven or more, typically eight or more layers. These tubes generally exhibit good product dispense properties. They tend to have good deadfold properties. Container bodies that do not have good deadfold properties tend to spring back after squeezing and dispensing product and tend to simultaneously suck air and product back into the container or container neck through its dispense orifice. This phenomena is referred to as "suckback". The air tends to oxidize or thicken the product and is expelled initially on the next squeezing or compression of the container. This can create undesirable audible effects, splattering, and reduced volume and non-uniform product dispensing. Thus, good product dispense properties, including good deadfold properties in multilayer collapsible dispensing tubes are desirable to reduce or eliminate suckback. They are also desirable to move product to and retain it in as-squeezed locations close to the tube's dispense orifice, and to facilitate and effectuate more rapid and more uniform and complete product dispensing.

Although foil-containing collapsible dispensing tubes have been suitable for many years, recently, in an effort to simplify and reduce the cost of producing multilayer collapsible dispensing tubes, the tube making industry has developed multilayer plastic, i.e., foilless, sheet structures and collapsible dispensing tubes to replace multilayer foil-containing structures and tubes. The production of foil-layer-containing sheet structures is involved because it requires lamination, for example, extrusion lamination and/or coating processes, while foilless plastic structures can be produced by a one step coextrusion process. Also, expensive metal foils can be replaced with plastic materials that provide sufficient barrier properties. Further, plastic structures hold the promise of using of fewer layers.

Yet, coextruded plastic multilayer sheet and collapsible dispensing tubes made therefrom have had their drawbacks. One is that the coextruded plastic sheet has not had sufficient deadfold properties, and hence tubes made therefrom have not had sufficient product dispense properties as compared to those of multilayer foil-containing sheet and tubes. Another is that multilayer plastic sheet, when it is asymmetric has not been formable into cylindrical tubular bodies on commercial tube making equipment because the sheet curls excessively. One reason is that the most commonly-used and effective plastic barrier layer replacement material for metal foil, ethylene vinyl alcohol copolymer ("EVOH"), tends to be stiff and appears to have properties that cause or contribute to excessive curling of asymmetric coextruded multilayer plastic sheet structures. Heretofore, to avoid excessive curling, the EVOH layer or layers has been symmetrically positioned, that is balanced, in the multilayer plastic sheet structure. This means that, for example, the EVOH layer has been positioned as the central layer of the structure, or, if it is not the central layer, it has been balanced by the use of another EVOH layer on the opposite side of the structure. Thus, in the commercial nine-layer coextruded multilayer plastic sheet having polyethylene (outer) /adhesive /EVOH/ adhesive/bulk/adhesive/EVOH/adhesive/ polyethylene (inner) layers, the bulk layer is the central layer and the EVOH layers are similarly positioned to either side of the bulk layer. Thus, the 9-layer sheet structure is symmetric. It does not exhibit a curling problem. Curling refers to the fact that the multilayer coextruded film and sheet (herein often merely referred to as "sheet") does not lay flat on a flat surface but curls upward from the surface. This makes the sheet difficult to handle. Curling persists even after the sheet has been wound on a roll during a typical storage period of several months and then unwound and used to make tubes. In commercially forming tubes, normal coextruded sheet has its inner surface-layer facing up and is wrapped about a cylindrical mandrel, and edges or edge portions of the sheet are joined together to form a cylindrical tubular body. However, asymmetric multilayer plastic sheet whose EVOH layer is not the central layer and is not otherwise balanced out positionally, tends to curl excessively and particularly downwardly in the direction of the outer surface layer (opposite to the direction desired). Hence, using commercial tube making equipment, the curved sheet is difficult to wrap around the mandrel and shape into a tubular body. If such sheets that exhibit excessive curling are formed into tubular bodies, the bodies are problematical because they tend to be oval rather than annular in cross sectional configuration. Consequently, they are difficult to load on cylindrical mandrels of tube heading machines that add or join a tube head to the tubular body. Even if successfully headed, such tube bodies have oval open ends that are difficult to fill with product because the nozzles or product filling lines typically are cylindrical and do not readily align with or fit into the oval open ends of the tube bodies. Thus, the nozzles sometimes crush the open ends of the tube bodies and/or deposit product on the outside surfaces of the tube bodies and on the filling equipment. These occurrences can cause filling line shut downs.

In view of the foregoing, it is an object of this invention to provide improved multilayer plastic structures, for example, film and sheet structures, that are suitable for producing improved collapsible dispensing containers for packaging food, dentifrice, cosmetic, industrial, home-use and other products.

It is another object of this invention to provide improved multilayer plastic film and sheet structures and collapsible dispensing containers made therefrom that are less expensive to produce than multilayer metal foil layer-containing structures and containers.

Another object of this invention is to provide aforementioned improved containers that have improved product dispense properties as compared to the product dispense properties of multilayer foil layer-containing collapsible dispense containers.

Another object of this invention is to provide aforementioned multilayer plastic film and sheet structures that have improved deadfold crease retention properties, and can, for example, be used to produce collapsible dispensing containers having such properties.

Another object of this invention is to provide the aforementioned containers with improved deadfold properties and hence acceptable levels of product suckback.

Another object of this invention is to provide asymmetric ethylene vinyl alcohol layer-containing multilayer plastic film and sheet structures that have acceptable levels of curling.

Another object of this invention is to provide six-layer asymmetric ethylene vinyl alcohol layer-containing plastic film and sheet structures that have acceptable levels of curling.

Yet another object of this invention is to provide aforementioned asymmetric film and sheet structures that can be formed into cylindrical tube bodies.

Yet another object of the invention is to provide aforementioned film and sheet structures and tubular bodies made therefrom whose surfaces are free of voids.

Still another object of this invention is to provide collapsible dispensing containers, i.e., tubes, whose body walls have improved column strength.

Still another object of this invention is to provide methods of producing the aforementioned improved film or sheet structures.

SUMMARY OF THE INVENTION

This invention is directed to a coextruded asymmetric multilayer plastic structure whose layers consist of a barrier layer comprised of an ethylene vinyl alcohol copolymer, an adhesive layer on each surface of the barrier layer, inner and outer surface layers, and a bulk layer positioned between one of the surface layers, preferably directly between the outer surface layer and an adjacent one of the adhesive layers, the bulk layer being comprised of a thermoplastic polymer and calcium carbonate in an amount sufficient that the multilayer structure has an acceptable level of curling. The bulk layer can include from about 30 to about 75 percent by weight calcium carbonate based on the weight of said bulk layer, higher loadings within the range, being preferred.

The structure can be a sheet having a thickness of 10 mils or more, or a film having a thickness of less than 10 mils. The structure can be a tubular body that has a longitudinal axis, a seam parallel to the axis and a cylindrical shape when viewed in cross section taken orthogonally across the axis. The tubular body can have two opposed open ends, one joined to a head to form a collapsible dispensing tube and the other having a cylindrical shape when viewed in cross section taken orthogonally across the axis. The thermoplastic polymer of the bulk layer preferably is comprised of polyolefins. For example, the bulk layer can be comprised of from about 10 to about 60 wt. % high density polyethylene, from about 10 to about 25 wt. % linear low density polyethylene, from about 3 to about 6 wt. % low density polyethylene, and from about 5 to about 25 wt. % of reground scrap from the structure.

The bulk layer can be comprised of about 52.5 wt. % calcium carbonate, about 17.5 wt. % linear low density polyethylene, about 20 wt. % high density polyethylene and about 3 wt. % low density polyethylene; or about 52.5 wt. % calcium carbonate, about 17.5 wt. % linear low density polyethylene, about 10 wt. % high density polyethylene, about 10 wt. % of reground scrap from the structure and about 3 wt. % low density polyethylene; or about 60 wt. % calcium carbonate, about 20 wt. % linear low density polyethylene, about 10 wt. % high density polyethylene and about 3 wt. % low density polyethylene.

In the structure, the outer layer can be comprised of low density polyethylene, the bulk layer can be comprised of polyethylene and from about 30 to about 75 percent by weight calcium carbonate based on the weight of the bulk layer, and the inner layer can be comprised of a blend of low density polyethylene and linear low density polyethylene. In the structure, the outer layer can be comprised of low density polyethylene, the bulk layer can be comprised of about 52.5 wt. % calcium carbonate, about 17.5 wt. % linear low density polyethylene, about 20 wt. % high density polyethylene and about 3 wt. % low density polyethylene, and the inner layer can be comprised of a blend of low density polyethylene and linear low density polyethylene.

This invention is also directed to a collapsible dispensing container having a body wall that is formed of an asymmetric multilayer plastic structure having a barrier layer, adhesive layers, inner and outer surface layers, and a bulk layer as described above wherein the calcium carbonate is present in an amount sufficient that the body wall has improved product dispense properties as compared with a multilayer plastic dispensing container that does not have calcium carbonate in a layer of its body wall. The barrier layer can comprise an ethylene vinyl alcohol copolymer, a polyamide or a polyester.

This invention is additionally directed to a method of forming a six-layer asymmetric plastic structure that has a barrier layer of ethylene vinyl alcohol copolymer and has an acceptable level of curling, which comprises coextruding the six-layer structure whose layers consist of the barrier layer, an adhesive layer on each surface of the barrier layer, inner and outer surface layers, and a bulk layer positioned between one of the surface layers and an adjacent one of said adhesive layers, the bulk layer being comprised of a thermoplastic polymer and calcium carbonate in an amount of from about 30 to about 75 percent by weight based on the weight of the bulk layer. The method can include the step of providing that the calcium carbonate comprises about 60 wt. % to about 70 wt. % of the bulk layer and contains less than 200 ppm moisture.

DETAILED DESCRIPTION OF THE DRAWINGS

Figure 1:
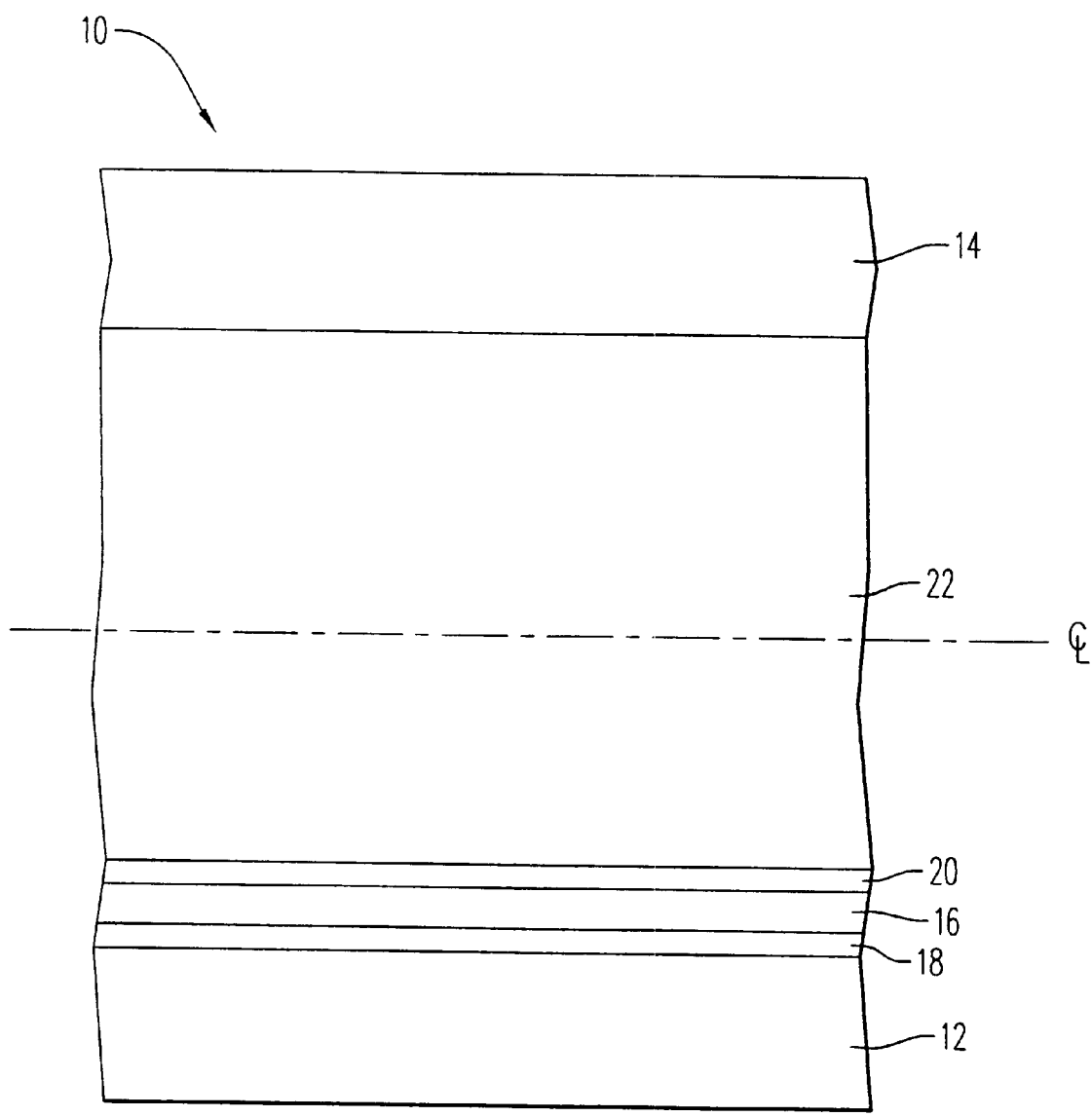
FIG. 1 is an enlarged vertical sectional view as would be taken through a preferred embodiment of a multilayer plastic structure of the invention.

FIG. 1 shows a preferred embodiment of the multilayer plastic (i.e. foilless) structure of the invention, generally designated 10. More particularly, FIG. 1 shows that structure 10 is an asymmetric six-layer foilless plastic film or sheet that has inner and outer surface layers 12, 14, a barrier layer 16, adhesive layers 18, 20, and a bulk layer 22 positioned between adhesive layer 20 and outer layer 14. Multilayer plastic structure 10 (hereafter, for simplicity, often referred to as "sheet 10") is suitable for producing the bodies of containers, for example, the tubular bodies of collapsible dispensing containers, e.g., tubes, for packaging foods, dentifrice, cosmetic, industrial, home-use and other products.

Figure 2:
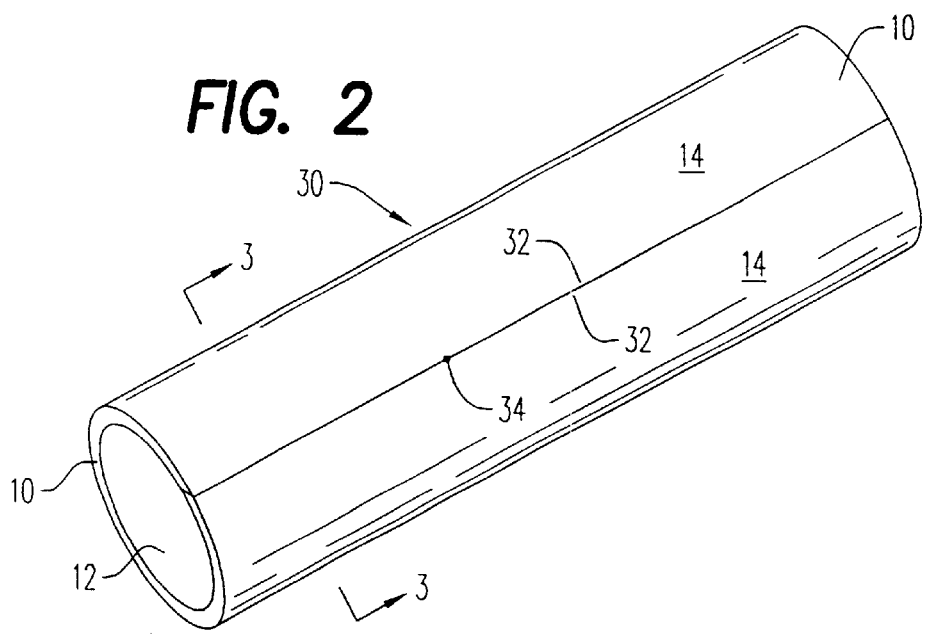
FIG. 2 is a perspective view of a tubular body formed from the structure of FIG. 1.

FIG. 2 shows a tubular body 30 formed from sheet 10 of FIG. 1. Typically, tubular body 30 is formed by wrapping sheet 10, inner layer 12-to-the-inside, around a cylindrical mandrel (not shown) and joining the edge portions or edges 32 of tubular body 30 together by heat sealing or welding to form a tubular body 30 having a suitable lapped or butt-welded side seam 34. Apparatus and methods for commercially wrapping a sheet or film structure around a mandrel and forming a collapsible dispensing tube body are disclosed in U.S. Pat. Nos. 3,388,017 and 3,575,769, the entire disclosures of which are incorporated herein by reference.

Figure 3:
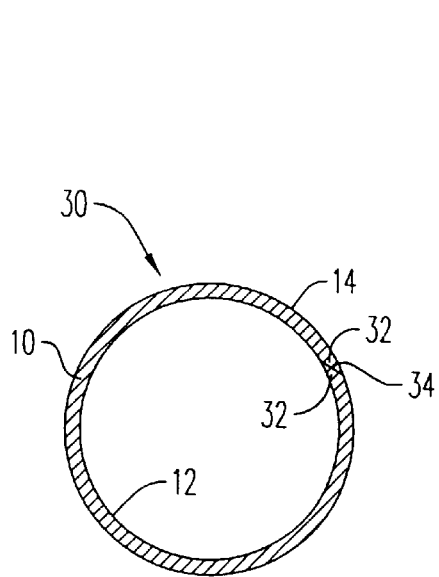
FIG. 3 is a vertical sectional view taken along line 3—3 of FIG. 2.
Figure 4:
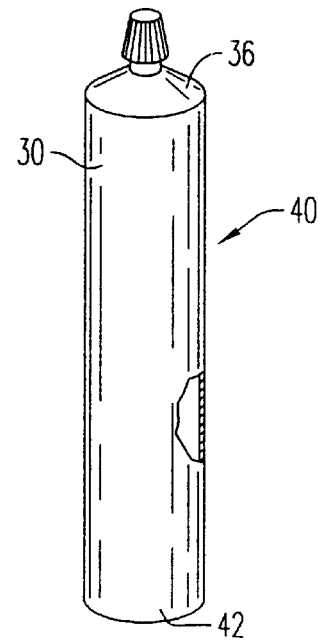
FIG. 4 is a front elevational view, with portions broken away, of an open-ended collapsible dispensing tube made from the tubular body of FIG. 2.
Figure 5:
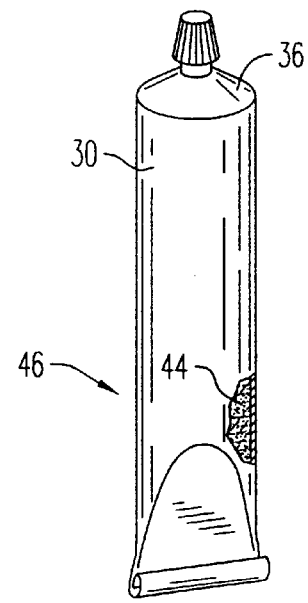
FIG. 5 is a front elevational view, with portions broken away, of the collapsible dispensing tube of FIG. 4 after the tube has been filled and sealed.

FIG. 3, a vertical sectional view taken orthogonally across the longitudinal axis of tubular body 30, shows that tubular body 30 is cylindrical or annular. As shown in FIG. 4, an end of tubular body 30 can be joined to a head 36 to form a collapsible dispensing tube 40 having a cylindrical open end 42. As shown in FIG. 5, tube 40 can be filled with a product, for example, a dentifrice 44, through open end 42 and sealed to form a sealed collapsible dispensing tube 46.

When sheet 10 is for packaging a dentifrice, generally speaking, inner layer 12 is a sealant material that is heat sealable to outer layer 14 and is compatible with the dentifrice to be packaged in the tube. When barrier layer 18 is moisture sensitive, inner layer 12 preferably also is a good moisture barrier at room temperature. Outer layer 14 is heat sealable to inner layer 12, is printable and provides surface gloss and a pleasant feel to the consumer. Barrier layer 16 is a barrier to oxygen and preferably also prevents or reduces flavor and/or aroma loss from the product. Adhesive layers 18, 20 are selected to bond the particular barrier layer 16 to the particular surface layer and to bulk layer 22. A bulk layer 22 can be positioned between inner layer 12 and adhesive layer 18, and/or between outer layer 14 and adhesive layer 20. Bulk layer 22 need not be, but preferably is the thickest layer of sheet 10 and preferably it has the highest weight percentage of any layer, based on the total weight of sheet 10. Typically, bulk layer 22 includes one or more inexpensive thermoplastic polymers, for example, one or more polyethylenes. The layer can be or include reground scrap obtained from the structure.

Sheet 10 preferably is a six-layer asymmetric foilless plastic sheet wherein, inner layer 12 is comprised of a blend of low density polyethylene (LDPE) and linear low density polyethylene (LLDPE), outer layer 14 is comprised of LDPE, barrier layer 16 is comprised of an ethylene vinyl alcohol copolymer, adhesive layers 18, 20 are each comprised of a LLDPE based, maleic anhydride-modified adhesive, and, in accordance with the invention, bulk layer 22 is comprised of one or more thermoplastic polymers and calcium carbonate. In sheet 10, preferably the thermoplastic polymers include high density polyethylene (HDPE), LLDPE, and LDPE. The HDPE provides some stiffness and moisture barrier properties to the structure. The LLDPE provides some toughness to the structure, and preferably is easily compounded and processed with the other materials of the bulk layer. The LDPE likewise is easily compounded with the other materials of the bulk layer and provides a good carrier for colorants or fillers such as titanium dioxide.

In accordance with the invention, the amount of calcium carbonate that is present in bulk layer 22 is an amount that provides one or more of certain desired properties to the structure, including to articles and containers, especially to tubular bodies made from the structure. Typically, the desired properties include that sheet 10 have an acceptable level of curling, meaning that, on a commercial tube body making machine, sheet 10 can be wrapped around a mandrel and formed into tubular bodies 30 that have a cylindrical, annular or circular cross sectional configuration, and that have a cylindrical open end if and when their opposite end is secured to the head of a tube. Desired properties also include desired product dispense properties, including that sheet 10 and tubular body 30 of collapsible dispensing tubes 40 and 46 have good deadfold crease retention properties and, accordingly, acceptable levels of rebound or spring-back of the sheet or body after it is creased, folded or rolled up, such that the body provides acceptable levels of suck-back of product into the tube body after product is dispensed. Acceptable levels of rebound and suckback are considered to be levels thereof that are improved over foilless multilayer plastic sheets and tubular bodies that do not have calcium carbonate in a layer thereof.

Generally, to obtain one or more of the above desired properties, the amount of calcium carbonate present in bulk layer 22 is from about 30 to about 75 percent by weight based on the weight of the bulk layer. Since higher calcium carbonate loadings in bulk layer 22 are preferred for obtaining the desired properties, the amount of calcium carbonate present more desirably is from about 45 to about 75 wt. %. Preferably the amount of calcium carbonate present is from about 45 to about 70 wt. %, more preferably from about 50 to about 70 wt. % and most preferably from about 60 to about 70 wt. % of bulk layer 22.

Generally, with all loading levels of calcium carbonate, the moisture content of the calcium carbonate should be kept low enough to prevent voids from forming in the surfaces of the structure due to volatilization of the moisture during the high temperature melt processing steps employed to form the structure. Generally, to avoid voids, the calcium carbonate employed should have less than about 500, preferably less than about 300, and most preferably less than about 200 ppm moisture, based on the concentrate in which the calcium carbonate is provided. The effect of the presence of moisture in or on the calcium carbonate in forming voids is less with lower loading levels than with higher loading levels. Thus, when loading levels of calcium carbonate are from about 45 to about 60 wt. %, the moisture content preferably is less than about 500 ppm, when loading levels are from about 50 to 60 wt. %, the moisture content preferably is less than about 300 ppm moisture, and when loading levels are from about 60 to about 75 wt. %, the moisture content preferably is less than about 200 ppm. In this invention, the moisture content is considered to be that which is present in or on the calcium carbonate concentrate pellets just prior their being melt formed into bulk layer 22.

The calcium carbonate can be obtained in particulate form, but preferably it is part of a concentrate that can be obtained in pellet form. The concentrate can have an aforementioned desired low moisture content as purchased, or the purchased concentrate pellets can be dried off line or in an extruder (not shown) in which the concentrate is melted, just prior to its being moved by the extruder screw to form the material of bulk layer 22. The preferred calcium carbonate employed in the concentrate has an average particle size of about 1 micron, and a maximum particle size of about 8 microns. Preferably, the calcium carbonate is in the form of irregular block particles. These are not flakes, layered or spherical. Preferably, the particles have been surface treated with about 1.5% of a fatty acid.

Although the calcium carbonate concentrate can be comprised of any suitable polyolefin carrier resin, preferably the carrier resin is a polyethylene, more preferably a linear low density polyethylene copolymer ("LLDPE"), especially a higher olefin LLDPE copolymer, e.g. of hexane or octene. The preferred calcium carbonate concentrate has a melt index of from about 2.0 to about 4.0 g/10min., an ash content of from about 74 to 77%, a moisture content of up to about 0.05% (500 ppm), and a density of from about 1.81 to about 1.89 g/cm$^3$.

TABLE I below shows various calcium carbonate concentrates CA-CF which are contemplated for use in bulk layer 22 of the invention, their calcium carbonate (CaCO$_3$) loading levels, their carrier resins and certain of their respective properties. The calcium carbonate concentrate CA is the preferred concentrate and is employed in the Examples of the sheet structures of the invention that are discussed below.

TABLE I

| CaCO$_3$ Conc. | Carrier Resin | Load | Carrier MI | Carrier Density | Conc. MI | Conc. Density |
|---|---|---|---|---|---|---|
| CA | Octene LLDPE | 75% | 20.0 | .920 | 3.0 | ~1.8 |
| CB | Octene LLDPE | 63% | 1.0 | .918 | 0.80 | ~1.5 |
| CC | Metallocene polymer | 75% | 6.0 | .910 | 1.75 | ~1.8 |
| CD | high pressure autoclave homopolymer LDPE | 75% | 40.0 | .920 | 10.0 | ~1.8 |
| CE | metallocene polymer | 70% | 6.0 | .910 | 2.0 | ~1.8 |
| CF | LDPE | 70% | 13 | .919 | 2.0 | ~1.8 |

MI = Melt Index, measured in g/10 min.
Density - Measured in g/cm$^3$
~ = Approximately The thermoplastic polymer(s) which comprise(s) bulk layer 22 can be one or more polyolefin(s). Preferably, the thermoplastic polymer(s) comprise(s) polyolefin(s). The polyolefin(s) can comprise ethylene polymers, including high, medium and low density polyethylenes, ethylene copolymers, for example, linear low density polyethylenes, very low and ultra low density polyethylenes, propylene polymers, including polypropylene, propylene copolymers, and blends of ethylene and propylene polymers and copolymers. One or more of these polymers can be formed by a polymerization reaction with a metallocene catalyst system, or with a single site catalyst, preferably a metallocene.

Desirably, the thermoplastic polymer material of bulk 22 is comprised of one or more polyethylenes. Preferably, the thermoplastic polymer is comprised of from about 10 to about 60 wt. %, more preferably from about 10 to about 30 wt. % HDPE, from about 10 to about 25 wt. %, preferably from about 15 to about 20 wt. % LLDPE, and from about 3 to about 6 wt. % LDPE.

In the preferred embodiment, bulk layer 22 also includes from about 5 to about 15 wt. % titanium dioxide. The LDPE and titanium dioxide are provided in a concentrate that preferably comprises about 70 wt. % titanium dioxide and about 30 wt. % LDPE, based on the total weight of the concentrate. The titanium dioxide is included to provide opacity and a white appearance to sheet 10. Bulk layer 22 can be comprised of reground scrap comprised of or made from the layers of sheet 10. If the reground scrap is included in bulk layer 22, typically it is employed instead of or to replace an amount of HDPE. When it is employed, the reground scrap desirably comprises about 6 to about 24 wt. %, preferably about 10 wt. % of bulk layer 22.

The following Comparative Examples A through K show various unsuccessful attempts to produce a six-layer EVOH layer-containing sheet coextruded foilless plastic sheet structures that had an acceptable level of curling, i.e., that could be commercially wrapped about a mandrel and formed into a cylindrical tubular body. None of the Comparative Examples had an acceptable level of curling. The structures of the Comparative Examples did not include calcium carbonate.

| COMPARATIVE EXAMPLE A | | | | |
|---|---|---|---|---|
| Sheet Layer | Layer Ratio, % | Materials | % Layer Composition | Caliper (mils) |
| Outer | 15.7 | LDPE | 100% LDPE | 1.76 |
| Bulk | 46.2 | 49% HDPE 30% LDPE 11% White concentrate 10% Regrind* | 49.0% HDPE 33.3% LDPE 7.7% TiO$_2$ 10.0% Regrind | 5.18 |
| Adhesive | 5.0 | Adh. (LLDPE based, MA Modified | 100% LLDPE | 0.56 |
| Barrier | 6.1 | EVOH | 100% EVOH | 0.68 |
| Adhesive | 5.0 | Adh. (LLDPE based, MA Modified) | 100% LLDPE | 0.56 |
| Inner | 22.0 | 72% LDPE 25% LLDPE 3% AB conc. | 74.3% LDPE 25.0% LLDPE 0.7% antiblock | 2.46 |
| TOTAL | 100 | | | 11.2 |

*Regrind = regrind scrap of the Comparative Example A structure.
AB - Antiblock

The sheet structure of Comparative Example A exhibited an unacceptable level of curling because it could not be commercially wrapped about a mandrel and formed into a cylindrical tubular body. Even if otherwise wrapped about a mandrel or otherwise formed into a tubular body, the tubular body would be oval when viewed in a cross section taken orthogonal through the longitudinal axis of the tubular body.

COMPARATIVE EXAMPLES B, C, D

In Comparative Examples B, C, and D, the same materials were employed as in Comparative Example A, except that the bulk layer consisted of:
71% HDPE
29% LDPE
10% Regrind.

The caliper of the layers was: outer layer 1.76 mil, bulk layer 4.68 mil, each adhesive layer 0.56 mil, EVOH layer 0.68 mil and inner layer 2.96 mil. Also, whereas in Comparative Example B the EVOH had about 32 mole % ethylene, a melt index of about 1.6 g/10min. and a density of about 1.19 g/cm$^3$ ("EVOH B"), the EVOH for Comparative Example C had about 44 mole % ethylene, a melt index of about 1.6 g/10min., and a density of about 1.14 g/cm$^3$ ("EVOH C"). Comparative Examples C and D were identical, except that in the former the take off winder roll tension was 60 lbs., while in the latter it was 75 lbs.

COMPARATIVE EXAMPLE E

In Comparative Example E, the same materials and layer thicknesses were employed as in Comparative Examples C and D, except that in Example E the outer layer material consisted of:

80% LDPE

20% HDPE, the thickness of the bulk layer was 4.86 mil and the thickness of the EVOH layer was 0.50 mil.

COMPARATIVE EXAMPLES F–I

In Comparative Example F, the sheet structure was the same as that of Comparative Example E, except that in Example F the outer layer material consisted of:

85% LDPE

10% EVOH

5% Adhesive. The adhesive in the outer layer was the same as that employed in the adhesive layers of the sheet structure.

In Comparative Example G, the sheet structure was the same as that of Comparative Example F, except that in Example G the thickness of the bulk layer and inner layer were 5.36 mil and 2.46 mil respectively.

In Comparative Example H, the sheet structure was the same as that of Comparative Example C, except that in Example H the barrier layer was EVQH B.

In Comparative Example I, the sheet structure was the same as that of Comparative Example F, except that in Example I the barrier layer was EVOH C.

In Comparative Example J, the sheet structure was the same as that of Comparative Example F, except that in Example J the outer layer consisted of 100% LDPE.

COMPARATIVE EXAMPLE K

| Sheet Layer | Layer Ratio, % | Layer Materials | Layer Composition Wt. % | Caliper (mils) |
|---|---|---|---|---|
| Outer | 20.0 | 100% LDPE | 100% LDPE | 2.00 |
| Bulk | 50.0 | 80% HDPE<br>20% White conc. (LDPE) | 80% HDPE<br>20% White conc.<br>• 70% TiO$_2$*<br>• 30% LDPE* | 5.00 |
| Adhesive | 2.50 | 100% Adh. (LLDPE based, MA Modified) | 100% Adh. | 0.25 |
| Barrier | 5.00 | EVOH | 100% EVOH | 0.50 |
| Adhesive | 2.50 | 100% Adh. (LLDPE based, MA Modified) | 100% Adh. | 0.25 |

COMPARATIVE EXAMPLE K -continued

| Sheet Layer | Layer Ratio, % | Layer Materials | Layer Composition Wt. % | Caliper (mils) |
|---|---|---|---|---|
| Inner | 20.0 | 72% LDPE<br>25% LLDPE<br>3% AB | 72% LDPE<br>25% LLDPE<br>3% AB conc.<br>• 25% AB<br>• 75% LDPE | 2.00 |
| TOTAL | 100 | | | 10.0 |

AB = Antiblock
*Based on the weight of the white concentrate
**Based on the weight of the A.B. concentrate The sheet structure shown in Comparative Example K exhibited severe curling.

Despite the above attempts in Comparative Examples A through K to produce six layer, EVOH layer-containing sheet coextruded foilless asymmetric plastic sheet structures that had acceptable levels of curling, including by adding EVOH or EVOH and adhesive resin to the outer layer to balance the non-centrally positioned EVOH layer, each of the sheet structures of Comparative Examples A through J had unacceptable levels of curling.

The multilayer plastic sheet structures of this invention having calcium carbonate in their bulk layers overcome the problematical phenomena of unacceptable curling of multiple layer plastic (i.e., foilless) film and sheet structures, especially coextruded asymmetric ones. It has been found that providing calcium carbonate, especially high loadings thereof, in a bulk layer 22 of sheet 10 prevents curling and enables the sheet to be formed into tubular bodies 30 which are cylindrical in cross section and which can easily be headed and filled with product.

In accordance with a preferred embodiment of the invention, the sheet structures of Examples 1 through 4, shown below, included calcium carbonate in the bulk layer of the structures. These sheet structures had acceptable levels of curling.

EXAMPLE 1

A multilayer foilless plastic sheet structure was made in the same manner as and was identical to the sheet structure of Comparative Example K, except that in Example 1, in accordance with the invention, the bulk layer included calcium carbonate and consisted of the following:

70% calcium carbonate concentrate:
  52.5% calcium carbonate
  17.5% LLDPE (octene) carrier resin
20% HDPE
10% white concentrate:
  7.0% TiO$_2$
  3.0% LDPE

EXAMPLES 2 AND 3

The sheet structures shown in Examples 2 and 3 below were the same as the structure of Example 1, except that in Examples 2 and 3 the structures had different layer ratios and layer thicknesses.

EXAMPLE 2

| Sheet Layer | Layer Ratio, % | Materials | % Layer Composition | Caliper (mils) |
|---|---|---|---|---|
| Outer | 18.18 | 100% LDPE | 100% LDPE | 2.00 |
| Bulk | 54.55 | 70% CaCO$_3$ Conc. | 52.5% CaCO$_3$ | 6.00 |
| | | 20% HDPE | 17.5% LLDPE | |
| | | 10% White Conc. | 20.0% HDPE | |
| | | | 7.0% TiO$_2$ | |
| | | | 3.0% LDPE | |
| Adhesive | 2.27 | Adh. (LLDPE based, MA Modified) | 100% LLDPE | 0.25 |
| Barrier | 4.55 | EVOH | 100% EVOH | 0.50 |
| Adhesive | 2.27 | Adh. (LLDPE based, MA Modified) | 100% LLDPE | 0.25 |
| Inner | 18.18 | 72% LDPE | 74.3% LDPE | 2.00 |
| | | 25% LLDPE | 25.0% LLDPE | |
| | | 3% AB | 0.7% antiblock | |
| TOTAL | 100 | | | 11.0 |

EXAMPLE 3

| Sheet Layer | Layer Ratio, % | Materials | % Layer Composition | Caliper (mils) |
|---|---|---|---|---|
| Outer | 16.36 | 100% LDPE | 100% LDPE | 1.80 |
| Bulk | 58.18 | 70% CaCO$_3$ Conc. | 52.5% CaCO$_3$ | 6.40 |
| | | 20% HDPE | 17.5% LLDPE | |
| | | 10% White Conc. | 20.0% HDPE | |
| | | | 7.0% TiO$_2$ | |
| | | | 3.0% LDPE | |
| Adhesive | 2.27 | Adh. (LLDPE based, MA Modified) | 100% LLDPE | 0.25 |
| Barrier | 4.55 | EVOH | 100% EVOH | 0.50 |
| Adhesive | 2.27 | Adh. (LLDPE based, MA Modified) | 100% LLDPE | 0.25 |
| Inner | 16.36 | 72% LDPE | 74.3% LDPE | 1.80 |
| | | 25% LLDPE | 25.0% LLDPE | |
| | | 3% AB | 0.7% antiblock | |
| TOTAL | 100 | | | 11.0 |

The sheet structure shown in Example 4 was the same as that of Example 3, except for the weight percentages of the components of the bulk layer.

EXAMPLE 4

| Sheet Layer | Layer Ratio, % | Materials | % Layer Composition | Caliper (mils) |
|---|---|---|---|---|
| Outer | 16.36 | 100% LDPE | 100% LDPE | 1.80 |
| Bulk | 58.18 | 80% CaCO$_3$ Conc. | 60.0% CaCO$_3$ | 6.40 |
| | | | 20.0% LLDPE | |
| | | 10% HDPE | 10.0% HDPE | |
| | | 10% White Conc. | 7.0% TiO$_2$ | |
| | | | 3.0% LDPE | |
| Adhesive | 2.27 | Adh. (LLDPE based, MA Modified) | 100% LLDPE | 0.25 |
| Barrier | 4.55 | EVOH | 100% EVOH | 0.50 |
| Adhesive | 2.27 | Adh. (LLDPE based, MA Modified) | 100% LLDPE | 0.25 |
| Inner | 16.36 | 72% LDPE | 74.3% LDPE | 1.80 |
| | | 25% LLDPE | 25.0% LLDPE | |
| | | 3% AB | 0.7% antiblock | |
| TOTAL | 100 | | | 11.0 |

The sheet structure shown in Example 5 was the same as that of Example 3, except for the bulk layer which included regrind material.

EXAMPLE 5

| Sheet Layer | Layer Ratio, % | Materials | % Layer Composition | Caliper (mils) |
|---|---|---|---|---|
| Outer | 16.36 | 100% LDPE | 100% LDPE | 1.80 |
| Bulk | 58.18 | 70% CaCO$_3$ Conc. | 52.5% CaCO$_3$ | 6.40 |
| | | 10% HDPE | 17.5% LLDPE | |
| | | 10% White Conc. | 10.0% HDPE | |
| | | 10% Regrind* | 7.0% TiO$_2$ | |
| | | | 3.0% LDPE | |
| | | | 10.0% Recycle | |
| Adhesive | 2.27 | Adh. (LLDPE based, MA Modified) | 100% LLDPE | 0.25 |
| Barrier | 4.55 | EVOH | 100% EVOH | 0.50 |
| Adhesive | 2.27 | Adh. (LLDPE based, MA Modified) | 100% LLDPE | 0.25 |
| Inner | 16.36 | 72% LDPE | 74.3% LDPE | 1.80 |
| | | 25% LLDPE | 25.0% LLDPE | |
| | | 3% AB Conc. | 0.7% antiblock | |
| TOTAL | 100 | | | 11.0 |

*Regrind = regrind scrap of the Comparative Example A structure

The sheet structures of Examples 1 through 4 of the invention were tested for curling. Although Example 5 was not tested for curling, given its similarity to Example 3 (except for a small amount of regrind in the bulk layer), its curl values are expected to be very similar to those of Example 3. A portion of the length of a roll of sheet structure whose width measured 9 inches was placed inner layer-side-down on a flat surface, while noting the machine direction of the sheet structure. A crisscross template made of plexiglass, that is larger than the sample portion of the sheet structure being tested and that has an X-shaped slit through its thickness was placed over the sample portion. Each slit was 6 inches long. The slits were disposed at 90° relative to each other and 45° relative to the machine direction of the sample portions. The sample portion was cut with a razor blade whose edge was passed through and moved along each slit from each corner to each center intersection for all four sections of the crisscross template. Four triangular sections of a still-intact sample are thus formed. Each triangular section-formed of the cut sample has a peak. The crisscross template was removed to allow the peaks of the triangular sections to curl upward away from the underlying flat surface. If any of the peaks remained in a downward position, they were freed by running a ruler underneath them. The crisscross template was then replaced with a framing template. The framing template was a rectangular frame measuring 8 inches long by 12.5 inches wide and having a 4 inch square cutout or hole therein. The hole was placed over the X-shaped slit in the sample so that the edges of the frame covered the ends of the slits and the periphery of the sample. The framing template holds the outer edges of the sample in place. The curl of each sample portion was measured by measuring the distance between the opposite peaks of the opposite triangular sections. The curl measurements were (made to the nearest $\frac{1}{32}^{nd}$ of an inch) and were recorded, noting the machine direction and cross machine direction.

It has been found that, using the above procedure to measure curling, samples of sheet structures having a curl measurement value in excess of 1 inch are unacceptable because they cannot be wrapped about a mandrel of commercial tube forming equipment and formed into cylindrical tubular bodies. Thus, sheet structures having a curl value of 1 inch or less are acceptable, because they can be so wrapped about a mandrel and formed into cylindrical tubular bodies. Preferably, curl values are less than about ¾ inch, and, most preferably, they are less than about ½ inch.

TABLE II below shows curl measurements taken in accordance with the above procedure on sample portions of the sheet structures of Examples 1 through 4. Values are given ⅟32nds of an inch.

TABLE II

| Sheet Structure | Machine Direction | Cross Machine Direction |
|---|---|---|
| Example 1 | 18 | 21 |
| 52.5% CaCO$_3$ | 17 | 23 |
| Bulk layer 5 mil | 16 | 20 |
| Example 2 | 12 | 20 |
| 52.5% CaCO$_3$ | 12 | 16 |
| Bulk layer 6 mil | 12 | 16 |
| Example 3 | 12 | 15 |
| 52.5% CaCO$_3$ | 16 | 16 |
| Bulk layer 6.4 mil | 15 | 16 |
| Example 4 | 8 | 12 |
| 60.0% CaCO$_3$ | 8 | 12 |
| Bulk layer 6.4 mil | 8 | 12 |

TABLE II shows that each of the sheet structures of Examples 1 through 4 had acceptable curl values. From an examination of Examples 3 and 4, it is seen that increasing the amount of CaCO$_3$ in the bulk layer without changing its thickness reduces curling. Thus, higher CaCO$_3$ loadings are preferred. From an examination of Examples 1 and 2, it is seen that increasing the thickness of the bulk layer while maintaining the CaCO$_3$ content constant in the bulk layer also reduces the curl value. Thus, relatively thick bulk layers containing CaCO$_3$ are preferred. An examination of Examples 1 and 4 shows that the lowest curl values are obtained with a high loading of CaCO$_3$ in a thicker bulk layer. Thus, high loadings of CaCO$_3$ in thicker bulk layers are most preferred. A consideration regarding the amount of CaCO$_3$ loadings is that excessively high loadings of CaCO$_3$, e.g., increasingly above about 75 wt. % reduces the cohesive strength of the layer. Also, excessively high loadings of CaCO$_3$ in either or both outer surface layers of a structure can result in weak side seams of tubular bodies that, as a result, may fail standard side seam, or tube burst or drop strength tests.

TABLE III below shows the percents by weight of the various layer materials based on the total weight of the respective sheet structures shown in Examples 1–4.

TABLE III

| Layer Material | Example 1 | Example 2 | Example 3 | Example 4 |
|---|---|---|---|---|
| LDPE | 27.61% | 24.89% | 22.33% | 21.29% |
| LLDPE | 18.20% | 18.12% | 18.25% | 19.97% |
| HDPE | 12.41% | 13.25% | 13.88% | 7.11% |
| EVOH | 4.77% | 4.24% | 4.17% | 3.94% |
| CaCO$_3$ | 32.57% | 34.77% | 36.44% | 42.64% |
| TiO$_2$ | 4.34% | 4.64% | 4.86% | 4.97% |
| Antiblock | 0.10% | 0.09% | 0.08% | 0.08% |

TABLE III shows that for the asymmetric sheet structures of Examples 1 through 4, that contain a layer of EVOH, acceptable amounts or levels of curling can be obtained when the amount of calcium carbonate present in the bulk layer is from about 6 to about 11 or more times the amount (percent by weight) of EVOH, based on the total weight of the sheet structure.

TABLE IV below shows, for the six layer sheet structures of Examples 1 through 4, desirable approximate calcium carbonate loading levels of the preferred calcium carbonate concentrate (CA of Table II) that can be used in bulk layers of varying thicknesses, the calcium carbonate being loaded into the bulk layers in the amounts of 40 and 80 wt. % of the bulk layer.

TABLE IV

| Bulk Layer Ratio Of Overall Sheet Structure | With 40% CaCO$_3$ Conc. - Loaded Bulk Layer | With 80% CaCO$_3$ Conc. - Loaded Bulk Layer |
|---|---|---|
| 40% | 14.15% | 32.57% |
| 50% | 17.15% | 38.37% |
| 60% | 19.96% | 43.54% |

TABLE IV shows that for bulk layers that are from about 40 to about 60 wt. % of the thickness of six layer sheet structures of the invention, the amount of calcium carbonate present in the sheet structures desirably can be from about 14 to about 43 wt. % or more based on the total weight of the structure.

The approximate properties of the preferred layer materials employed in the Comparative Examples, and in the sheet structures of the invention and sheet structure OF (below) are shown in TABLE V below.

TABLE V

| Material | Melt Index | Density | Notes |
|---|---|---|---|
| LDPE | 2.0 | .918 | — |
| LLDPE | 2.0 | .919 | — |
| HDPE | 1.15 | .960 | — |
| LLDPE | 1.70 | .905 | — |
| EVOH | 1.6 | 1.19 | 32 mol % |
| EVOH | 1.6 | 1.14 | 44 mol % |
| White Conc. | Conc - na | conc - 2.0 | 70% TiO$_2$ |
|  | Base - 13.0 | base - .918 | 30% LDPE |
| Antiblock Conc | Conc - na | conc - 1.36 | 25% AB |
|  | Base 2.0 | base - .923 | 75% LDPE | na - not available

Conventional sheet coextrusion processing conditions were employed for producing the sheet structures of the invention. For example, processing of the respective materials was done at their respective sheet coextrusion melt temperatures. The processing melt temperature of the bulk layer was effected within the range of from about 400° to about 450° F. Preferably, it is affected at about 425° F. A multilayer feed block and a single slot die were employed. Unless otherwise indicated, sheet structures, herein and throughout, are understood to include film and sheet structures. Sheet structures of the invention were formed into tubular bodies on American National Can Company Series 6200 Sideseamer Machines. It is to be noted that the structures of the invention can be made by any suitable method known in the art. The coextruded structures can be made by any coextrusion process, including by coextrusion of a tubular sleeve. Also, container bodies, including body walls, and containers can be made using any suitable methods known in the art, including by coextrusion blow molding and by multilayer injection molding and blow molding.

The inclusion of CaCO$_3$ in the bulk layer of six layer EVOH layer-containing asymmetric foilless plastic sheet structures improves product dispense properties of collapsible dispensing containers, e.g., tubes, whose bodies are made from such sheet structures. Desirable product dispense properties of collapsible dispensing tubes include that the tube bodies have good deadfold properties. That is, that when deformed, i.e., when for example, folded, creased, collapsed or squeezed, the bodies tend to remain in or hold their deformed shape. This is desirable because it causes the product contained in the tube to tend to stay in the location to which it is moved upon deformation of the tube. Collapsible dispensing tubes that have good deadfold properties, i.e., metal tubes, can be dispensed from the bottom end gradually on up the tube body, and the tube can be rolled up from the bottom to maintain ample product near the tube head and orifice. Further, the tendency of the tube body to maintain its deformed state and not rebound to its undeformed state tends to reduce suckback of product into the tube nozzle and body.

Apart from metal tubes, collapsible dispensing tubes whose bodies include a foil layer have had the next best product dispense properties. They have relatively good deadfold and suckback properties. An example of such a commercial collapsible dispensing tube has a body wall made from the foil layer-containing eight layer sheet structure "FF" shown below:

| FOIL SHEET STRUCTURE FF | | | |
|---|---|---|---|
| Sheet Layer | Weight % of Structure | Materials | Caliper, (mils) |
| Outer layers | 45.48 | Coex Film LDPE layer HDPE layer HDPE layer | 5.0 |
| Next layer | 14.96 | LDPE | 2.0 |
| Adhesive | 5.98 | EAA (Ethylene Acrylic Acid) Copolymer | 0.80 |
| Barrier | 12.63 | FOIL (50 gauge, alum.) | 0.50 |
| Adhesive | 8.80 | EAA | 1.10 |
| Inner | 12.15 | LLDPE | 1.60 |
| TOTAL | 100 | | 11.0 |

A commercial collapsible dispensing tube having a body wall made from the foilless symmetric 9-layer sheet structure "OF" is shown below. Foilless collapsible dispensing tubes such as the OF structure have less, but a commercially acceptable level of product dispense properties, including deadfold and suckback.

| FOILLESS SHEET STRUCTURE "OF" | | | | |
|---|---|---|---|---|
| Sheet Layer | Layer Ratio, % | Materials | % Layer Composition | Caliper (mils) |
| Outer | 16.7 | 100% LDPE | 100% LDPE | 2.00 |
| Adhesive | 2.5 | LLDPE based, MA Modified | 100% LLDPE | 0.30 |
| Barrier | 4.2 | EVOH | 100% EVOH | 0.50 |
| Adhesive | 2.5 | LLDPE based, MA Modified | 100% LLDPE | 0.30 |
| Bulk | 48.2 | 80% HDPE 14% White conc. 6% Regrind | 80.0% HDPE 4.2% LDPE 9.8% TiO$_2$ 6.0% Recycle | 5.80 |
| Adhesive | 2.5 | LLDPE based, MA Modified | 100% LLDPE | 0.30 |
| Barrier | 4.2 | EVOH | 100% EVOH | 0.5 |

-continued

| FOILLESS SHEET STRUCTURE "OF" | | | | |
|---|---|---|---|---|
| Sheet Layer | Layer Ratio, % | Materials | % Layer Composition | Caliper (mils) |
| Adhesive | 2.5 | LLDPE based, MA Modified | 100% LLDPE | 0.30 |
| Inner | 16.7 | 72% LDPE 25% LLDPE 3% AB Conc. | 74.3% LDPE 25.0% LLDPE 0.7% antiblock | 2.0 |
| TOTAL | 100 | | | 12.0 |

Sheet structure "OF" is symmetrical because it has two identical EVOH layers each an equal distance from the horizontal center line that extends through the central bulk layer of the structure. Because the structure is symmetrical, it does not exhibit curling.

A series of four tests was run to compare the product dispense properties of the preferred 6 layer foilless plastic sheet structure of the invention with those of sheet structures FF and OF.

Tubes having heads joined to cylindrical tubular bodies (1 11/32" by 7 27/32") that were made from the sheet structures of Examples 1 through 4 of the invention and from sheet structures FF and OF, were capped, filled with a dentifrice product, sealed and subjected to the following tests:

Plump Out Test—A tube filled with dentifrice is laid flat with its side seam down and a cap on, on a flat surface. The middle of the tube body is squeezed firmly with forefinger and thumb. Rebound of tube is observed. (The indentation formed in the body on one or both sides may rebound back to original unindented shape.)

Suckback Test—The cap is removed and about a one-inch ribbon of product is dispensed from the middle of the tube. Excess product is wiped from the tube nozzle while maintaining light squeeze pressure on the tube. The pressure is released when the tube is laid flat again, and suckback of product into tube body or nozzle is observed.

Triple Fold Test—Product is dispensed from the tube by creasing the body just below the endseal and rolling up the tube over three additional folds. Then the tube is returned to the layflat position and the tendency for the rolled portion of the body to unfold at the creases is observed.

Roll Up Test—Additional product is dispensed from the tube by continuing to roll the tube up, following the creases started in the triple fold, until about one inch from the tube head. The tube is returned to the layflat position and the tendency of tube to unroll is observed.

The above tests were performed in succession, allowing up to several minutes between tests to permit the tubes to establish an equilibrium position.

The results of the above product dispense tests are shown in TABLE VI below.

TABLE VI

PRODUCT DISPENSE TESTS

| Structure Variable | No Dispense Plump Out | First Dispense Suckback | Second Dispense Triple Fold | Third Dispense Roll Up |
|---|---|---|---|---|
| Ex. 1 | None | into body | mostly unrolls | worse -unrolls |
| Ex. 2 | None | into body | mostly unrolls | medium unroll |
| Ex. 3 | None | into body | mostly unrolls | medium unroll |
| Ex. 4 | None | into body | mostly unrolls | least unroll |
| OF | one side | *into body | unrolls the most | worst -unrolls the most |
| FF | None | into nozzle | mostly holds fold | holds roll |

*Suckback of product was observed to be deeper into the tube than any of the variables of Examples 1 through 4.

TABLE VI shows that all of the product dispense properties tested of the sheet structures of Examples 1 through 4 were better than those of the commercial foilless OF structure and were closer (than those of OF structure) to the product dispense properties of the commercial foil layer-containing FF structure. TABLE VI also shows that the more $CaCO_3$ present in the bulk layer of the structure, the better are the product dispense properties of the tube.

Curling has been attributed mainly to the presence of an EVOH layer in an asymmetric structure because, as disclosed herein, the use of an LDPE layer instead of an EVOH layer in such a structure eliminates curl. The more asymmetric the EVOH-containing structure, the greater the curl. It has been found that the use of EVOH materials with higher ethylene content, e.g. above 32 mole %, for example, 44 mole % ethylene, has some effect on reducing curl, but it is at the expense of reduced barrier properties of the EVOH. Attempts to lower curling by varying coextrusion-processing conditions, for example, melt temperatures, roll temperatures, die gap and die-to-nip geometry, have been found to have little effect.

In accordance with the invention, the inclusion of $CaCO_3$ in a layer of an asymmetric EVOH layer-containing coextruded multilayer foilless sheet structure, preferably in a thick layer, that preferably is located to the opposite side of the center line from where the EVOH layer is positioned, provides improved acceptable curl values. This is believed to apply to such sheet structures that are coextruded or that include coextruded layers, one of which is an EVOH layer. Thus, it is believed to apply to such sheet structures that are entirely sheet or cast coextruded or blown coextruded by themselves, and/or when either or both are laminated or extrusion coated onto other layers. The above is considered to apply regardless of the number of layers of the sheet structure. To obtain improved, acceptable curling of such sheet structures, the $CaCO_3$ preferably is present in an internal, i.e., non-surface layer, that is not the EVOH layer and is not the adhesive layer, since $CaCO_3$ loadings, especially high loadings, therein would be expected to deleteriously affect the barrier and adhesion properties of those respective layer materials. However, the $CaCO_3$ can be contained in a surface layer, preferably the outer surface layer of the sheet structure when the EVOH layer is to the inner layer side of the centerline of the structure. Thus, improved acceptable levels of curling can be obtained in such sheet structures in which the $CaCO_3$ is present in an outside surface preferably a thick one. Although loadings of $CaCO_3$ high enough to obtain acceptable curling are needed, the loadings should not be excessively high, e.g. over about 55 wt. %, such that tube side seam strength would be reduced to the point that the seam and/or tube would fail standard side seam adhesion, burst and/or drop strength tests. It is to be noted that in the instance that $CaCO_3$ loadings are in one or both surface layers, sufficient adhesion and strength of heat seals, e.g. side seams, can be more easily obtained when the respective outer and inner surface layer materials are considered to be readily heat sealable to each other. As examples, the LDPE outer surface layer material and the LDPE/LLDPE blend inner surface layer materials of the preferred sheet structure are readily heat sealable to each other and with moderate $CaCO_3$ loadings in one or both surface layers, acceptable heat seals would be obtained. It is contemplated that the $CaCO_3$ that can be present in the bulk layer of the preferred sheet structures and in the amounts disclosed herein can be distributed in a plurality of layers of the sheet structure. This is considered to be especially so if all or most of such layers are to the other side of the center line of the structure from the EVOH layer, and especially if the total of the thicknesses of the layers containing the $CaCO_3$ equals, is similar to or is within the range of bulk layer thicknesses disclosed herein.

With respect to product dispense properties, they are improved when $CaCO_3$ is included in a layer, especially in a thick layer, of a foilless sheet structure. It is preferred that the layer be an internal layer, preferably, one that is closer to the outer surface than to the center line of the structure. Product dispense properties can be improved by including the $CaCO_3$ in the outer surface layer, especially in an outer layer that is thick, especially if it is thicker than the other layers of the structure. It has been found that when moderate to lower levels of $CaCO_3$ are employed in the outer surface layer to obtain the needed heat sealability to the inner layer, less deadfold properties are obtained. Thus, it is preferred to provide the calcium carbonate in an internal layer that is close to the outer layer where loading can be high, there is little effect on seam strength and the effect of the calcium carbonate on providing improved dispense properties is relatively high.

It is expected that magnesium carbonate, calcium sulphite, barium sulphite and barium sulfate, could be employed instead of or in combination with the preferred $CaCO_3$, but these are not the preferred filler materials for reducing curl and/or improving deadfold. Aside from ethylene vinyl alcohol copolymers, materials which may be employed as the barrier layer in the structures of the invention include polyamides and polyesters. Unacceptable curling of a structure that does not include calcium carbonate has been noted with a polyamide barrier layer in the structure.

The sheet structures of the invention having $CaCO_3$ in a layer thereof, preferably in the bulk layer, as disclosed herein are also advantageous in that collapsible dispensing tubes having tubular bodies made from the sheet structures have improved column strength as compared to comparable tubular bodies that do not include $CaCO_3$. Column strength refers to the axial strength or ability of the tubular body wall to resist axial pressure imparted by the tube loader of a filling machine on the open end of the empty tubular body as its head is being seated in the pocket of the filling table of a filling machine. If the tubular body does not have sufficient column strength and the tube is deformed by the loader, the filling nozzle may deflect or partly crush the tubular body wall and product may then spill onto the filling table and cause a line shutdown.

Although the improved structure of the invention has often been described herein in terms of a tubular body, preferably a cylindrical tubular body, it is to be understood that the plastic structures of the invention can be or can be used to form articles including container bodies of any shape and configuration. With respect to collapsible dispensing tubes, the tubular bodies can have any shape, including square, when viewed in cross section. The sheet structure of the invention can be used to form one or more tubes of a collapsible dual dispense tube. In the case of a tube-within-a-tube, the structure can be used as the outer tube, for example, with a single layer plastic inner tube, or as the inner tube with a foil layer containing outer tube.

Having thus described the structures and methods of the invention with particular reference to preferred embodiments thereof, it will be apparent that various changes and modifications may be made therein without departing from the spirit and scope of the invention as defined in the appended claims.

What is claimed is:

1. A coextruded asymmetric multilayer plastic structure whose layers comprise:

a barrier layer comprised of an ethylene vinyl alcohol copolymer;

an adhesive layer on each surface of said barrier layer;

inner and outer surface layers; and a bulk layer positioned between one of said surface layers and an adjacent one of said adhesive layers, said bulk layer being comprised of a thermoplastic polymer, said bulk layer further comprising about 52.5 wt. % calcium carbonate, about 17.5 wt. % linear low density polyethylene, about 10 wt. % high density polyethylene, about 10 wt. % of reground scrap from the structure and about 3 wt. % low density polyethylene based on the weight of the bulk layer.

2. A collapsible dispensing container having a body wall that is formed of an asymmetric multilayer plastic structure whose layers comprise:

a barrier layer;

an adhesive layer on each surface of said barrier layer;

inner and outer surface layers; and a bulk layer positioned between one of said surface layers and an adjacent one of said adhesive layers, said bulk layer being comprised of a thermoplastic polymer, said bulk layer further comprising about 52.5 wt. % calcium carbonate, about 17.5 wt. % linear low density polyethylene, about 10 wt. % high density polyethylene, about 10 wt. % of reground scrap from the structure and about 3 wt. % low density polyethylene based on the weight of the bulk layer.

* * * * *